United States Patent
Bastawros et al.

(10) Patent No.: US 7,280,277 B2
(45) Date of Patent: Oct. 9, 2007

(54) LIGHT COLLIMATING AND DIFFUSING FILM AND SYSTEM FOR MAKING THE FILM

(75) Inventors: Adel F. Bastawros, Newburgh, IN (US); Kevin P. Capaldo, Mt. Vernon, IN (US); Ashwit Dias, Goa (IN); John Graf, Ballston Lake, NY (US); Emine Elif Gurel, Evansville, IN (US); Grant Hay, Evansville, IN (US); Marshall Gordon Jones, Scotia, NY (US); Karkala Arun Kumar, Evansville, IN (US); Steven Alfred Tysoe, Ballston Spa, NY (US); Masako Yamada, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/429,842

(22) Filed: May 8, 2006

(65) Prior Publication Data

US 2006/0245059 A1  Nov. 2, 2006

Related U.S. Application Data

(62) Division of application No. 10/710,585, filed on Jul. 22, 2004, now Pat. No. 7,092,163.

(51) Int. Cl.
*G02B 5/02* (2006.01)
*G02B 27/30* (2006.01)

(52) U.S. Cl. ................ 359/599; 359/641; 359/900

(58) Field of Classification Search ............. 359/599, 359/641, 619–622, 628, 900; 362/558, 608; 349/112, 62, 64, 65
See application file for complete search history.

(56) References Cited

U.S. PATENT DOCUMENTS

| 5,944,405 | A | 8/1999 | Takeuchi |
| 6,285,001 | B1 | 9/2001 | Fleming ............... 219/121.72 |
| 6,297,908 | B1 * | 10/2001 | Suga ........................ 359/599 |
| 6,452,653 | B1 | 9/2002 | Yamanaka et al. ......... 349/113 |
| 6,476,890 | B1 | 11/2002 | Funahata ................. 349/113 |

(Continued)

FOREIGN PATENT DOCUMENTS

WO  WO/03/032074  4/2003

(Continued)

OTHER PUBLICATIONS

PCT Search Report, PCT/US2005/025699 Mailing date Oct. 28, 2005.

*Primary Examiner*—Ricky Mack
*Assistant Examiner*—Jack Dinh
(74) *Attorney, Agent, or Firm*—Cantor Colburn LLP

(57) ABSTRACT

A light collimating and diffusing film and a method for making the film are provided. The film includes a plastic layer having a first side and a second side opposite the first side and at least a first peripheral edge. The first side has a first textured surface, wherein between 7 to 20 percent of slope angles on the first textured surface proximate a first axis has a value between zero and five degrees. The first axis is substantially parallel to the first peripheral edge. The plastic layer collimates light propagating therethrough.

18 Claims, 12 Drawing Sheets

U.S. PATENT DOCUMENTS

| | | |
|---|---|---|
| 6,583,936 B1 | 6/2003 | Kaminsky .................... 359/619 |
| 6,636,363 B2 | 10/2003 | Kaminsky .................... 359/707 |
| 6,721,102 B2 | 4/2004 | Bourdelais ................... 359/628 |
| 2002/0018161 A1 | 2/2002 | Yamanaka ................... 349/112 |
| 2002/0027627 A1 | 3/2002 | Yamada ....................... 349/113 |
| 2002/0033915 A1 | 3/2002 | Masaki |
| 2002/0191134 A1 | 12/2002 | Funahata ..................... 349/113 |
| 2003/0025852 A1 | 2/2003 | Ishitake ........................ 349/62 |
| 2003/0030372 A1 | 2/2003 | Masaki |
| 2003/0169499 A1 | 9/2003 | Bourdelais ................... 359/599 |
| 2003/0169512 A1 | 9/2003 | Bourdelais ................... 359/707 |
| 2003/0169513 A1 | 9/2003 | Kaminsky .................... 359/707 |
| 2003/0170442 A1 | 9/2003 | Kaminsky ................. 428/315.5 |
| 2003/0223533 A1 | 12/2003 | Hsieh ............................ 378/19 |
| 2004/0068167 A1 | 4/2004 | Hsieh .......................... 600/407 |
| 2004/0080725 A1 | 4/2004 | Kaminsky .................... 353/120 |
| 2004/0120136 A1 | 6/2004 | Olczak |

FOREIGN PATENT DOCUMENTS

| | | |
|---|---|---|
| WO | WO 03032074 | 4/2003 |

* cited by examiner

Polymer Film Front Surface Slope Distribution

Textured Surface on Cylindrical Roller Obtained
Using Energy Beam Engraving Process Textured Surface on the Film using Cylindrical Roller Obtained
from Energy Beam Engraving Process Textured Surface on Cylindrical Roller Obtained using Partical-metal Co-deposition Process Textured Surface on the Film using Cylindrical Roller Obtained from Particle-metal Co-deposition Process

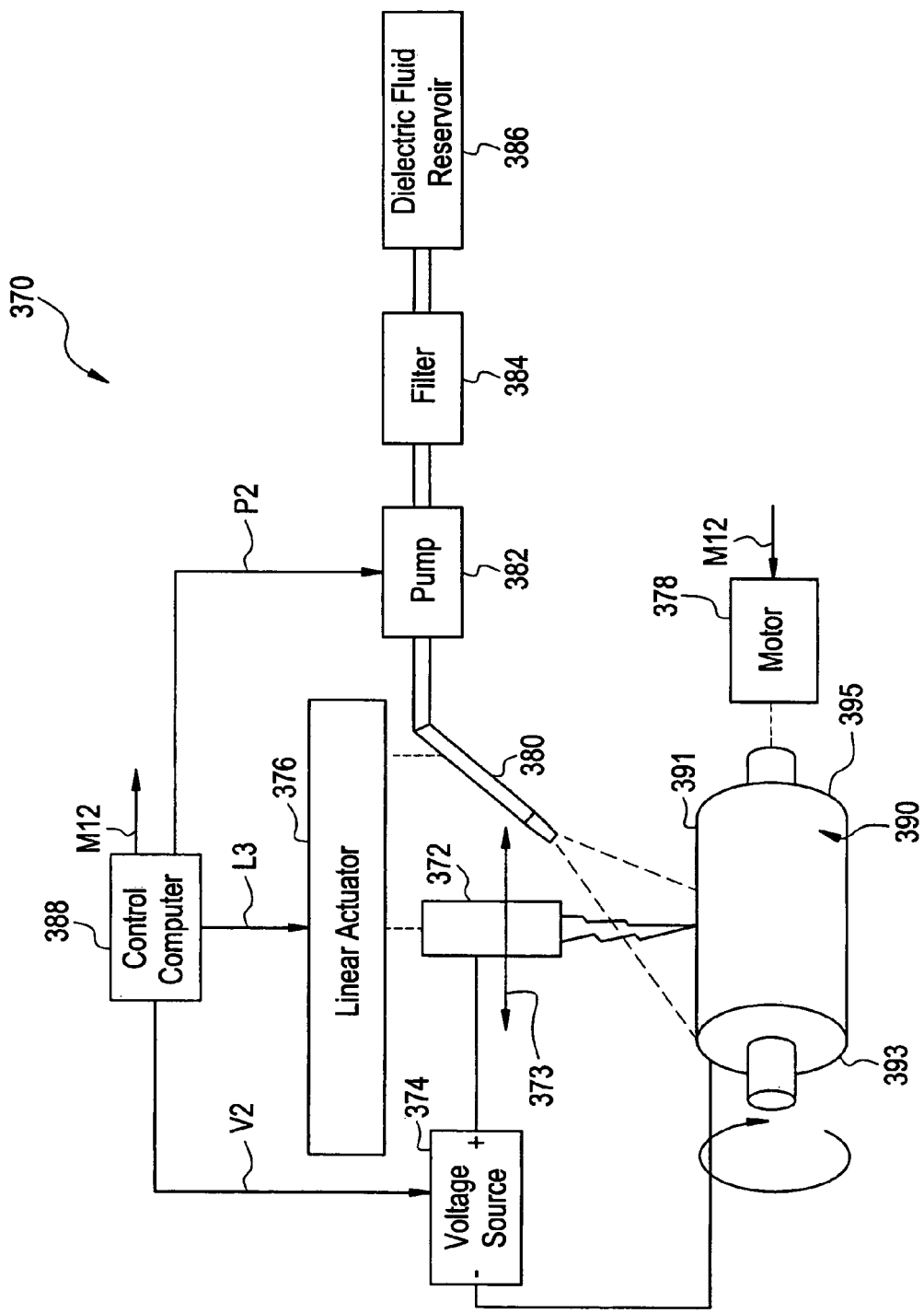

LIGHT COLLIMATING AND DIFFUSING FILM AND SYSTEM FOR MAKING THE FILM

CROSS REFERENCE TO RELATED APPLICATION

The application is a divisional application of U.S. application Ser. No. 10/710,585, filed Jul. 22, 2004, now U.S. Pat. No. 7,092,163, the contents of which are incorporated herein by reference thereto.

BACKGROUND OF THE INVENTION

A light diffusive film has been developed for receiving light and diffusing the light. The light diffusive film is manufactured using multiple manufacturing steps. First, a plurality of polystyrene beads are disposed in an acrylate solution. The acrylate solution is then applied to a surface of a plastic film. Thereafter, the plastic film is heated to cure the acrylate and to bond the polystyrene beads to the plastic film. A significant drawback with the manufacturing process of the light diffusive film is that it requires several relatively complex steps to coat the film with the acrylate solution and polystyrene beads. Further, the manufacturing process is relatively expensive to perform.

Accordingly, there is a need for a light diffusive film that can be manufactured using a simplified process without utilizing polystryene beads or an acrylate solution.

BRIEF DESCRIPTION OF THE INVENTION

A light collimating and diffusing film in accordance with an exemplary embodiment is provided. The film includes a plastic layer having a first side and a second side opposite the first side and at least a first peripheral edge. The first side has a first textured surface, wherein between 7 to 20 percent of slope angles on the first textured surface proximate a first axis has a value between zero and five degrees. The first axis is substantially parallel to the first peripheral edge. The plastic layer collimates light propagating therethrough.

A method for manufacturing a light collimating and diffusing film in accordance with another exemplary embodiment is provided. The method includes extruding heated plastic through a die to form a plastic layer. The plastic layer has a first side and a second side opposite the first side and at least a first peripheral edge. The plastic layer extends along both a first axis and a second axis. The first axis is substantially parallel to the first peripheral edge. The second axis is substantially perpendicular to the first axis. The method further includes cooling at least one of first and second rotating cylindrical rollers below a predetermined temperature. The method further includes moving the plastic layer between first and second rotating cylindrical rollers. The first cylindrical roller contacts the first side of the plastic layer and the second cylindrical roller contacts the second side. The first cylindrical roller forms a first textured surface on the first side of the plastic layer, wherein between 7 to 20 percent of slope angles on the first textured surface proximate the first axis have a value between zero and five degrees.

A system for manufacturing a light collimating and diffusing film in accordance with another exemplary embodiment is provided. The system includes an extruder device operably coupled to a die. The extruder device urges heated plastic through the die to form a plastic layer. The plastic layer has a first side and a second side opposite the first side and at least a first peripheral edge. The plastic layer extends along both a first axis and a second axis. The first axis is substantially parallel to the first peripheral edge. The second axis is substantially perpendicular to the first axis. The system further includes first and second cylindrical rollers disposed proximate one another for receiving the plastic layer. The system further includes a cooling device configured to cool at least one of the first and second cylindrical rollers below a predetermined temperature. The first cylindrical roller contacts the first side of the plastic layer and forms a first textured surface on the first side of the plastic layer. The second cylindrical roller contacts the second side of the plastic layer, wherein between 7 to 20 percent of slope angles on the first textured surface proximate the first axis have a value between zero and five degrees.

A method for manufacturing a light collimating and diffusing film in accordance with another exemplary embodiment is provided. The method includes heating a plastic layer having a first side and a second side. The plastic layer has a first side and a second side opposite the first side and at least a first peripheral edge. The plastic layer extends along both a first axis and a second axis. The first axis is substantially parallel to the first peripheral edge. The second axis is substantially perpendicular to the first axis. The method further includes heating at least one of the first and second cylindrical rollers above a predetermined temperature. The method further includes moving the plastic layer between first and second rotating cylindrical rollers wherein the first cylindrical roller contacts the first side of the plastic layer and the second cylindrical roller contacts the second side. The first cylindrical roller forms a first textured surface on the first side proximate the first axis of the plastic layer, wherein between 7 to 20 percent of slope angles on the first textured surface proximate the first axis have a value between zero and five degrees.

A system for manufacturing a light collimating and diffusing film in accordance with another exemplary embodiment is provided. The system includes a first heating device configured to heat a plastic layer. The plastic layer has a first side and a second side opposite the first side and at least a first peripheral edge. The plastic layer extends along both a first axis and a second axis. The first axis is substantially parallel to the first peripheral edge. The second axis is substantially perpendicular to the first axis. The system further includes first and second cylindrical rollers being disposed proximate one another for receiving the plastic layer. The system further includes a second heating device configured to heat at least one of first and second cylindrical rollers. The first cylindrical roller contacts the first side of the plastic layer and forms a first textured surface on the first side and the second cylindrical roller contacts the second side of the plastic layer, wherein between 7 to 20 percent of slope angles on the first textured surface proximate the first axis have a value between zero and five degrees.

A tool for forming a textured surface on a light collimating and diffusing film in accordance with another exemplary embodiment is provided. The tool includes a cylindrical portion disposed about a first axis and having an external textured surface and first and second ends. The cylindrical portion further includes a first line disposed proximate the external textured surface extending substantially across the cylindrical portion substantially perpendicular to the first end. The cylindrical portion further includes a second line extending around a periphery of the cylindrical portion substantially a predetermined distance from the first end. The external textured surface has a plurality of projecting portions and a plurality of trough portions, wherein each projecting portion extends outwardly from at least one adjacent trough portion. The plurality of projecting portions and the plurality of trough portions define a plurality of slope angles, wherein between 7 to 20 percent of the slope angles on the external textured surface proximate the first line or the second line have a value between zero and five degrees.

A method for forming a textured surface on a cylindrical roller in accordance with another exemplary embodiment is provided. The cylindrical roller is disposed about a first axis and has an external textured surface and first and second ends. The cylindrical roller further includes a first line disposed proximate the external textured surface extending substantially across the cylindrical roller substantially perpendicular to the first end. The cylindrical roller further includes a second line extending around a periphery of the cylindrical portion substantially a predetermined distance from the first end. The method includes rotating the cylindrical roller at a predetermined rotational speed about the first axis. The method further includes emitting a pulsating energy beam that contacts the outer surface of the cylindrical roller at a predetermined intensity and moving the energy beam from the first end to the second end of the cylindrical roller during the rotation of the cylindrical roller. The energy beam removes portions of the outer surface to obtain the textured surface, wherein between 7 to 20 percent of slope angles on the textured surface proximate the first line or the second line have a value between zero and five degrees.

A method for forming a textured surface on a cylindrical roller in accordance with another exemplary embodiment is provided. The cylindrical roller is disposed about a first axis and has an external textured surface and first and second ends. The cylindrical roller further includes a first line disposed proximate the external textured surface. The first line extends substantially across the cylindrical roller substantially perpendicular to the first end. The cylindrical roller further includes a second line extending around a periphery of the cylindrical portion substantially a predetermined distance from the first end. The method includes rotating the cylindrical roller at a predetermined rotational speed about the first axis in an electrolyte fluid. The cylindrical roller is electrically grounded. The method further includes applying a predetermined current density to the electrolyte fluid wherein metal ions in the fluid bond to the outer surface of the cylindrical roller to form the textured surface, wherein between 7 to 20 percent of slope angles on the textured surface proximate the first line or the second line have a value between zero and five degrees.

A method for forming a textured surface on a cylindrical roller in accordance with another exemplary embodiment is provided. The cylindrical roller is disposed about a first axis and has an external textured surface and first and second ends. The cylindrical roller further includes a first line disposed proximate the external textured surface. The first line extends substantially across the cylindrical roller substantially perpendicular to the first end. The cylindrical roller further includes a second line extending around a periphery of the cylindrical portion substantially a predetermined distance from the first end. The method further includes rotating the cylindrical roller at a predetermined rotational speed about the first axis in a fluid containing metal ions and non-metal particles. The method further includes chemically bonding the metal ions and the non-metal particles to the outer surface of the cylindrical roller to form the textured surface, wherein between 7 to 20 percent of slope angles on the textured surface proximate the first line or the second line have a value between zero and five degrees.

A method for forming a textured surface on a cylindrical roller in accordance with another exemplary embodiment is provided. The cylindrical roller is disposed about a first axis and having an external textured surface and first and second ends. The cylindrical roller further includes a first line disposed proximate the external textured surface. The first line extends substantially across the cylindrical roller substantially perpendicular to the first end. The cylindrical roller further includes a second line extending around a periphery of the cylindrical portion substantially a predetermined distance from the first end. The method includes rotating the cylindrical roller at a predetermined rotational speed about the first axis. The method further includes applying a dielectric fluid on the cylindrical roller. The method further includes iteratively discharging an electric spark from one or more electrodes disposed proximate the cylindrical roller. The electric spark contacts the outer surface of the cylindrical roller that heats and melts a predetermined amount of metal on the cylindrical roller to form the textured surface. The electric spark is moved from the first end to the second end of the cylindrical roller during the rotation of the cylindrical roller, wherein between 7 to 20 percent of slope angles on the textured surface proximate the first line or the second line have a value between zero and five degrees.

A method for forming a textured surface on a cylindrical roller in accordance with another exemplary embodiment is provided. The cylindrical roller is disposed about a first axis and has an external textured surface and first and second ends. The cylindrical roller further includes a first line disposed proximate the external textured surface. The first line extends substantially across the cylindrical roller substantially perpendicular to the first end. The cylindrical roller further includes a second line extending around a periphery of the cylindrical portion substantially a predetermined distance from the first end. The method includes rotating the cylindrical roller at a predetermined rotational speed about the first axis. The method further includes iteratively contacting the outer surface of the cylindrical roller using a cutting tool at a predetermined frequency. The cutting tool moves from the first end to the second end of the cylindrical roller during the rotation of the cylindrical roller. The cutting tool removes portions of the outer surface to obtain the textured surface, wherein between 7 to 20 percent of slope angles on the textured surface proximate the first line or the second line have a value between zero and five degrees.

A method for forming a textured surface on a cylindrical roller in accordance with another exemplary embodiment is provided. The cylindrical roller is disposed about a first axis and has an external textured surface and first and second ends. The cylindrical roller further includes a first line disposed proximate the external textured surface. The first line extends substantially across the cylindrical roller substantially perpendicular to the first end. The cylindrical roller further includes a second line extending around a periphery of the cylindrical portion substantially a predetermined distance from the first end. The method includes coating the cylindrical roller with a chemically resistant layer, wherein the chemically resistant layer is removed at predetermined locations to expose the underlying cylindrical roller surface at the predetermined locations. The method further includes rotating the cylindrical roller at a predetermined rotational speed about the first axis in a container containing an etching solution. The etching solution removes portions of the cylindrical roller at the predetermined locations to obtain the textured surface, wherein between 7 to 20 percent of slope angles on the textured surface proximate the first line or the second line have a value between zero and five degrees.

A back lighted device in accordance with another exemplary embodiment is provided. The back lighted device includes a light source. The back lighted device further includes a light guide disposed proximate the light source for receiving light from the light source. The back lighted device further includes at least one plastic layer having a first side and a second side opposite the first side and at least a first peripheral edge. The first side has a first textured surface, wherein between 7 to 20 percent of slope angles on the first textured surface proximate a first axis have a value between zero and five degrees, the first axis being substantially parallel to the first peripheral edge, wherein the plastic layer collimates light propagating therethrough.

A light collimating and diffusing film in accordance with another exemplary embodiment is provided. The film includes a unitary layer wherein greater than or equal to 80 percent of a total mass of the unitary layer comprises a polycarbonate compound. The unitary layer has a first side and a second side opposite the first side and at least a first peripheral edge. The first side has a first textured surface, wherein between 7 to 20 percent of slope angles on the first textured surface proximate a first axis have a value between zero and five degrees. The first axis is substantially parallel to the first peripheral edge. The plastic layer collimates light propagating therethrough.

Other systems and/or methods according to the embodiments will become or are apparent to one with skill in the art upon review of the following drawings and detailed description. It is intended that all such additional systems and methods be within the scope of the present invention, and be protected by the accompanying claims.

BRIEF DESCRIPTION OF THE DRAWINGS

FIG. 23 is a schematic of an electric discharge engraving system for obtaining a textured surface on a cylindrical roller in accordance with another exemplary embodiment.

DETAILED DESCRIPTION OF THE INVENTION

Figure 1:
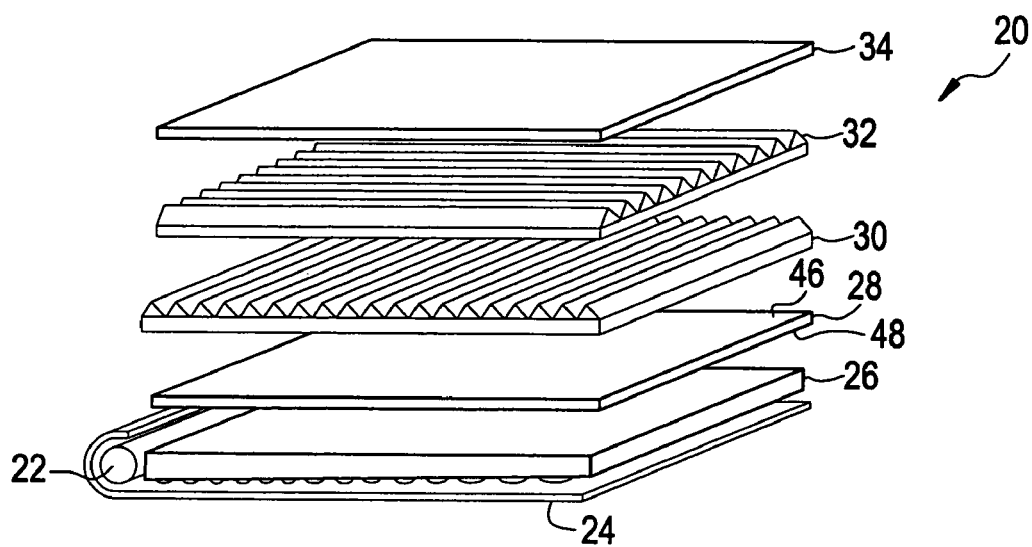
FIG. 1 is an exploded view of a back lighted device in accordance with an exemplary embodiment.
Figure 2:
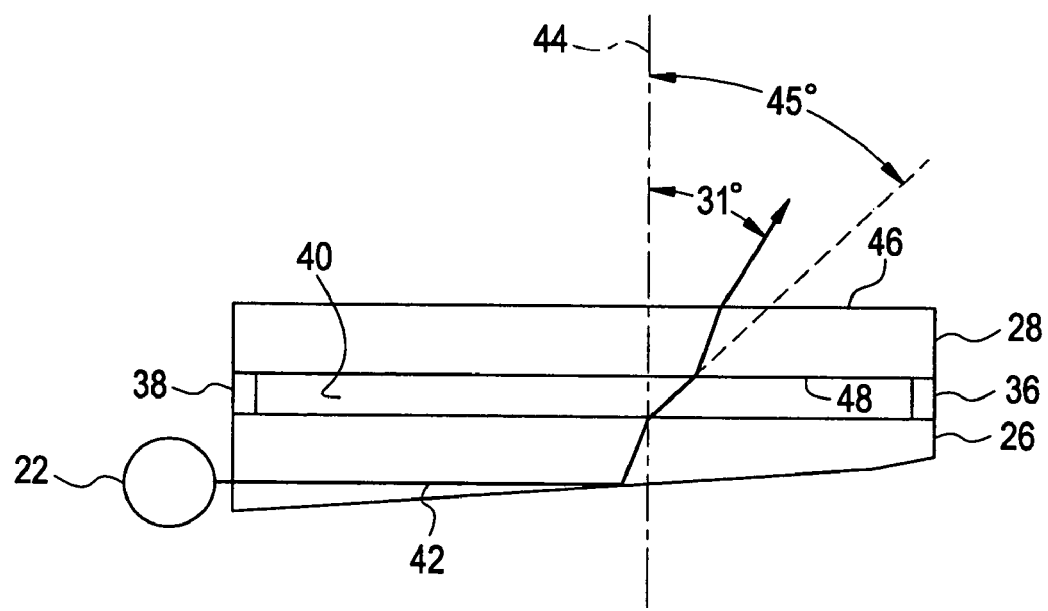
FIG. 2 is a schematic of a portion of the back lighted device of FIG. 1.

Referring to FIGS. 1 and 2, a back lighted device 20 for illuminating a liquid crystal display device (not shown) is illustrated. The back lighted device 20 includes a light source 22, a reflector film 24, a light guide 26, a light collimating and diffusing film 28, a light collimating film 30, a light collimating film 32, and a light diffuser film 34. As shown, the light source 22 is disposed at a first end of the light guide 26. Further, the reflector film 24 is disposed, proximate a first side of the light guide 26. A first side of the light collimating and diffusing film 28 is disposed proximate a second side of the light guide 26 and is spaced apart from the light guide 26 utilizing posts 36, 38. The posts 36, 38 form an air gap 40 between the light guide 26 and the film 28. The light collimating film 30 is disposed proximate a second side of the film 28. Finally, the light collimating film 32 is disposed proximate the light collimating film 30 and the light diffusing film 34 is disposed proximate the light collimating film 32.

The path of an exemplary light beam propagating through both the light guide 26 and the light collimating and diffusing film 28 will now be explained. The light source 22 emits a light beam 42 that propagates through the light guide 26 and is refracted therein toward an axis 44 that is substantially perpendicular to a top surface of the light guide 26. When the light beam 42 exits the light guide 26 and the air gap 40, the light beam 42 is refracted away from the axis 44 at approximately 45 degrees. When the light beam 42 enters the light collimating and diffusing film 28, the film 28 refracts the light beam 42 toward the axis 44. Thereafter, when the light beam 42 exits the film 28 to light beam is refracted away from the axis 44 at approximately 31 degrees. Thereafter, the light beam 42 enters the bottom side of the light collimating film 30 at a 31 degree angle relative of the axis 44 and propagates through the film 30. The film 30 refracts the light beam at a top surface thereof to a zero degree angle relative to the axis 44. Because the light beam enters film 32 at a zero degree angle relative to the axis 44, the film 32 provides a relatively high luminance along axis 44.

Figure 3:
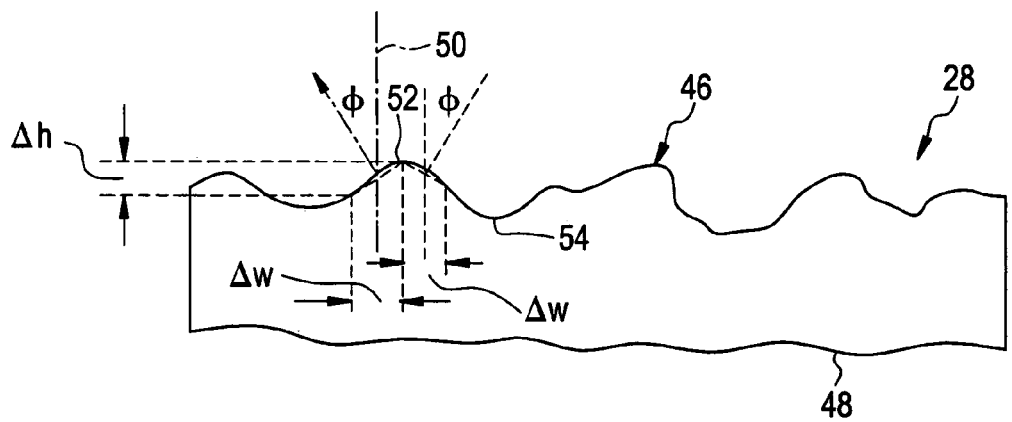
FIG. 3 is a cross-sectional schematic of a light collimating and diffusing film utilized in the back lighted device of FIG. 1 in accordance with another exemplary embodiment.

Referring to FIGS. 2 and 3, the light collimating and diffusing film 28 will now be explained in greater detail. The film 28 is utilized to refract light beams toward the axis 44. The film 28 is constructed from a unitary plastic layer having a thickness in a range of 0.025-10 millimeters. Of course, the film 28 can be constructed with a thickness less than 0.025 millimeters or greater than 10 millimeters. The film 28 has an optical brightener compound disposed in the plastic layer wherein a mass of the optical brightener compound is in a range of 0.001-1.0 percent of a total mass of the plastic layer. The film 28 further includes an antistatic compound, such as fluorinated phosphonium sulfonate, disposed in the plastic layer. Fluorinated phosphonium sulfonate has a general formula: $\{CF_3(CF_2)_n(SO_3)\}^{\ominus}\{P(R_1)(R_2)(R_3)(R_4)\}^{\oplus}$ wherein F is fluorine; n is an integer of from 1-12, S is sulfur; $R_1$, $R_2$ and $R_3$ are the same element, each having an aliphatic hydrocarbon radical of 1-8 carbon atoms or an aromatic hydrocarbon radical of 6-12 carbon atoms; and $R_4$ is a hydrocarbon radical of 1-18 carbon atoms. The film 28 further includes an ultraviolet (UV) absorber compound disposed in the plastic layer wherein a mass of the UV absorber compound is in a range of 0.01-1.0 percent of a total mass of the plastic layer. The film 28 includes a textured top surface 46 having a plurality of projecting portions 52 and a plurality of trough portions 54. The average height of the plurality of projecting portions 52 is within a range of 25-75 percent of an average width of the plurality of projecting portions. Further, the average width of the plurality of projecting portions 52 is within a range of 0.5-100 microns. The projecting portions 52 and the trough portions 54 are distributed on the top surface 46 to obtain a desired slope angle distribution.

The slope angle distribution is a distribution of a plurality of slope angles along at least one predetermined trajectory on the light collimating and diffusing film 28. Further, each slope angle ($\phi$) is calculated using the following equation:

Slope Angle$\phi$=arc tan $|\Delta h/\Delta w|$ where:

($\Delta w$) represents a predetermined width along the textured surface 46, such as 0.5 microns for example;

($\Delta h$) represents a height difference between (i) a lowest position on the textured surface 46 along the width ($\Delta w$), and (ii) a highest position on the surface 46 along the width ($\Delta w$).

The slope angles reported in this patent application for a plastic film can be calculated from filtered two dimensional surface profile data generated using a Surfcoder ET 4000 instrument manufactured by Kosaka Laboratory Limited, Tokyo, Japan. The operational settings of the Surfcoder ET 4000 instrument are as follows: Cutoff=0.25 mm, Sample Length and Evaluation Length both set at 10 mm. The speed being set at 0.1 mm/second with profile data being obtained at 8000 equally spaced points.

The slope angles reported in this patent application for a cylindrical roller can be calculated from filtered two dimensional surface profile data generated using a Surfcoder SE 1700α instrument also manufactured by Kosaka Laboratory Limited. The operational settings of the Surfcoder SE 1700α instrument are as follows: Evaluation Length=7.2 mm, Cut-off Lc=0.800 mm. The speed being set at 0.500 mm/second with profile data being obtained at 14400 points.

The slope angle distribution can be determined along a predetermined reference trajectory or line on the plastic layer. Alternately, a slope angle distribution can be determined on an entire surface of the plastic layer using multiple reference trajectories or lines.

Figure 6:
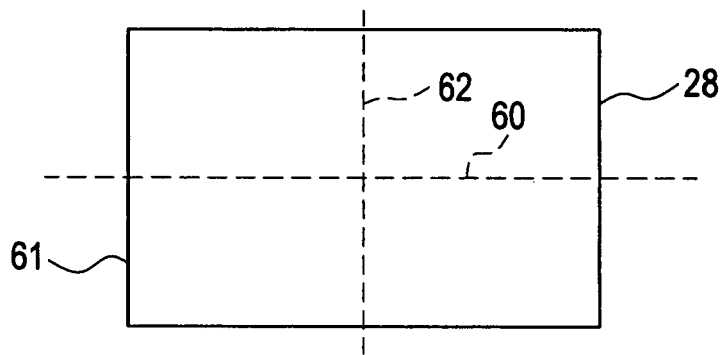
FIG. 6 is a top view of a light collimating and diffusing film illustrating exemplary trajectories for determining a slope angle distribution.
Figure 8:
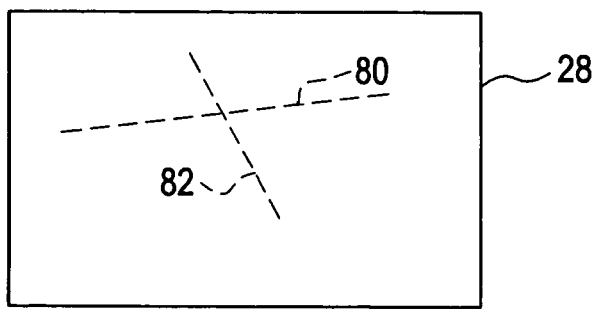
FIG. 8 is a top view of a light collimating and diffusing film illustrating exemplary trajectories for determining a slope angle distribution.

For example, referring to FIGS. 6 and 8, a plurality of slope angles ($\phi$) can be calculated along a predetermined trajectory across textured surface 46, such as an axis 62 that is parallel to an edge 61 of the film 28, or an axis 60 that is perpendicular to the axis 62. Alternately, the plurality of slope angles ($\phi$) can be calculated along a line 80 or a line 82. In one or more of the foregoing trajectories, the desired slope angle distribution comprises between 7 to 20 percent of slope angles having a value between zero and five degrees.

Figure 4:
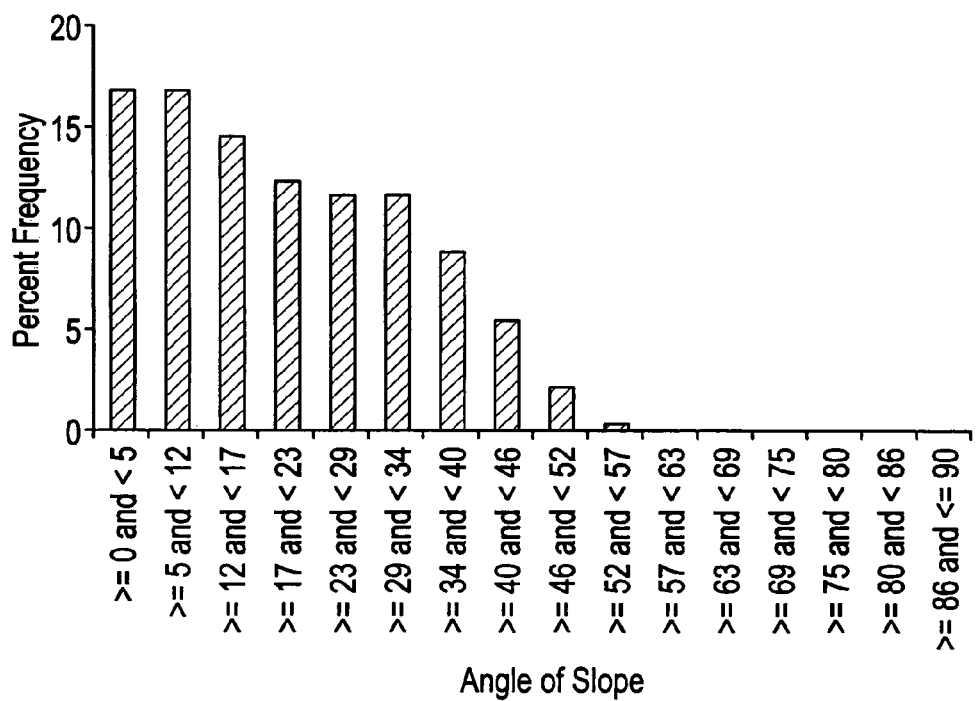
FIG. 4 is a graph indicating a slope distribution on a front surface of the light collimating and diffusing film.

Referring to FIG. 4, a graph illustrating a slope angle distribution on a textured surface 46 on a first side of the film 28 in accordance with an exemplary embodiment is illustrated. The inventors herein have recognized that when 20 percent or less of slope angles on the textured surface 46, and preferably between 7 to 20 percent of slope angles on the surface 46, have a value between zero and five degrees, adjacent brightness enhancing films (e.g., films 30 and 32) have increased luminance with respect to the axis 44.

Referring to FIGS. 1 and 2, the percentage of slope angles between zero and five degrees on the textured top surface 46 controls the angle of the light that exits the film 28 and enters the light collimating film 30. When the percentage of slope angles on the surface 46 is about 16 percent, the light exits the film 28 at a 31 degree angle relative to axis 44 as shown. In an alternate embodiment, if it is desirable for the light to exit the film 28 at an angle greater than 31 degrees relative to the axis 44, then the film 28 could be constructed with greater than 16 percent of the slope angles having a value between zero and five degrees. In another alternate embodiment, if it is desirable for the light to exit the film 28 at an angle less than 31 degrees relative to the axis 44, then the film 28 could be constructed with less than 16 percent of the slope angles having a value between zero and five degrees.

Referring to FIG. 3, the film 28 also has a textured surface 48 on a second side of the film 28. The textured surface 48 has a slope angle distribution wherein greater than or equal to or 70 percent of the slope angles on the textured surface 48 have a value between zero and five degrees.

Figure 9:
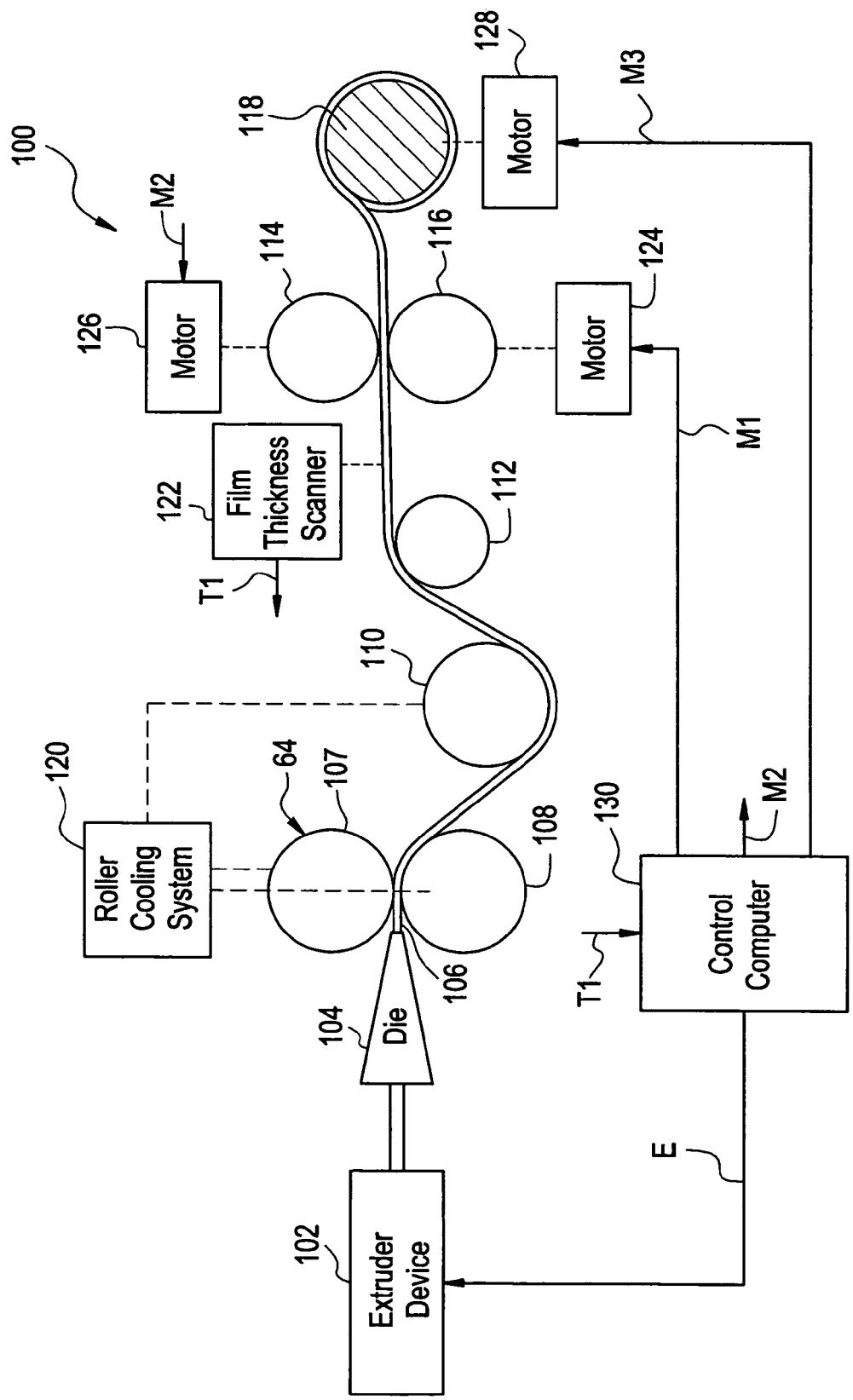
FIG. 9 is a schematic of a melt calendaring system for manufacturing a light collimating and diffusing film in accordance with another exemplary embodiment.

Referring to FIG. 9, a melt calendaring system 100 for manufacturing a textured plastic layer 106 that can be subsequently cut into a predetermined shape to form light collimating and diffusing film 28 is illustrated. The melt calendaring system 100 includes an extruder device 102, a die 104, cylindrical rollers 64, 108, 110, 112, 114, 116, a cylindrical spool 118, a roller cooling system 120, a film thickness scanner 122, motors 124, 126, 128, and a control computer 130.

The extruder device 102 is provided to heat plastic above a predetermined temperature to induce the plastic to have a liquid state. The extruder device 102 is operably coupled to the die 104 and to the control computer 130. In response to a control signal (E) from the control computer 130, the extruder device 102 heats plastic therein above a predetermined temperature and urges the plastic through the die 104 to form the plastic layer 106.

The cylindrical rollers 64, 108 are provided to receive the plastic layer 106 therebetween from the die 104 and to form a textured surface on a least one side of the plastic layer 106. The cylindrical rollers 64, 108 are preferably constructed from steel and are operably coupled to the roller cooling system 120. Of course, in an alternate embodiment, the cylindrical rollers 64, 108 may be constructed from other metallic or non-metallic materials known to those skilled in the art. The roller cooling system 120 maintains a temperature of the rollers 64, 108 below a predetermined temperature to solidify the plastic layer 106 as it passes between the rollers 64, 108. The cylindrical roller 64 has a textured surface 107 wherein between 7 to 20 percent of slope angles on the textured surface 107 or along at least one trajectory on the textured surface 107 have a value between zero and five degrees. Thus, when the cylindrical roller 64 contacts a first side of the plastic layer 106, the cylindrical roller 64 forms a textured surface on the plastic layer 106, wherein between 7 to 20 percent of slope angles on the surface 46 of the layer 106 or along at least one trajectory on the textured surface 46 have a value between zero and five degrees.

Figure 5:
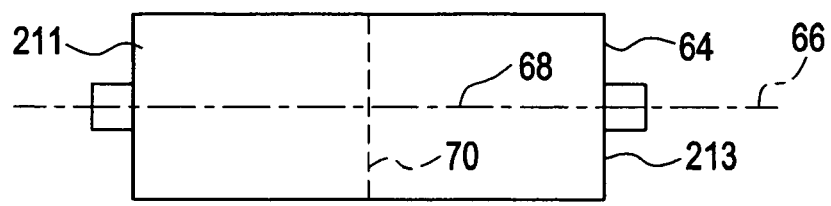
FIG. 5 is a top view of a cylindrical roller illustrating exemplary trajectories for determining a slope angle distribution.
Figure 7:
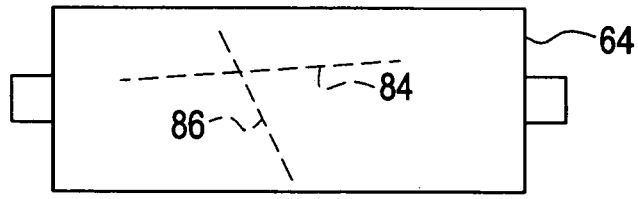
FIG. 7 is a top view of a cylindrical roller illustrating exemplary trajectories for determining a slope angle distribution.

Referring to FIGS. 5 and 7, the slope angles ($\phi$) of the cylindrical roller 64 can be determined along a predetermined trajectory across the outer surface 107, such as a line 68 extending substantially across the roller 64 substantially perpendicular to the end 211 or a line 62 extending substantially around a periphery of the roller 64 a predetermined distance from the end 211. Alternately, the slope angles ($\phi$) of the cylindrical roller 64 can be determined along a line 84 or a line 86.

The cylindrical rollers 110, 112 are configured to receive the plastic layer 106 after the layer 106 has passed between the rollers 64, 108. The position of the cylindrical roller 110 can be adjusted to vary an amount of surface area of the plastic layer 106 that contacts the cylindrical roller 108. The cylindrical roller 110 is operably coupled to the roller cooling system 120 that maintains the temperature of the roller 110 below a predetermined temperature for solidifying the plastic layer 106. The cylindrical roller 112 receives a portion of the plastic layer 106 downstream of the roller 110 and directs the plastic layer 106 toward the cylindrical rollers 114, 116.

The cylindrical rollers 114, 116 are provided to receive the plastic layer 106 therebetween and to move the plastic layer 106 toward the cylindrical spool 118. The cylindrical rollers 114, 116 are operably coupled to the motors 126, 124, respectively. The control computer 130 generates control signals (M1), (M2) which induce motors 124, 126, respectively, to rotate the rollers 116, 114 in predetermined directions for urging the plastic layer 106 towards the spool 118.

The cylindrical spool 118 is provided to receive the textured plastic layer 106 and to form a roll of plastic layer 106. The cylindrical spool 118 is operably coupled to the motor 128. The control computer 130 generates a control signal (M3) that induces the motor 128 to rotate the spool 118 in predetermined direction for forming a roll of the plastic layer 106.

The film thickness scanner 122 is provided to measure a thickness of the plastic layer 106 prior to the layer 106 being received by the cylindrical rollers 114, 116. The film thickness scanner 122 generates a signal (T1) indicative of the thickness of the plastic layer 106 that is transmitted to the control computer 130.

Figure 10:
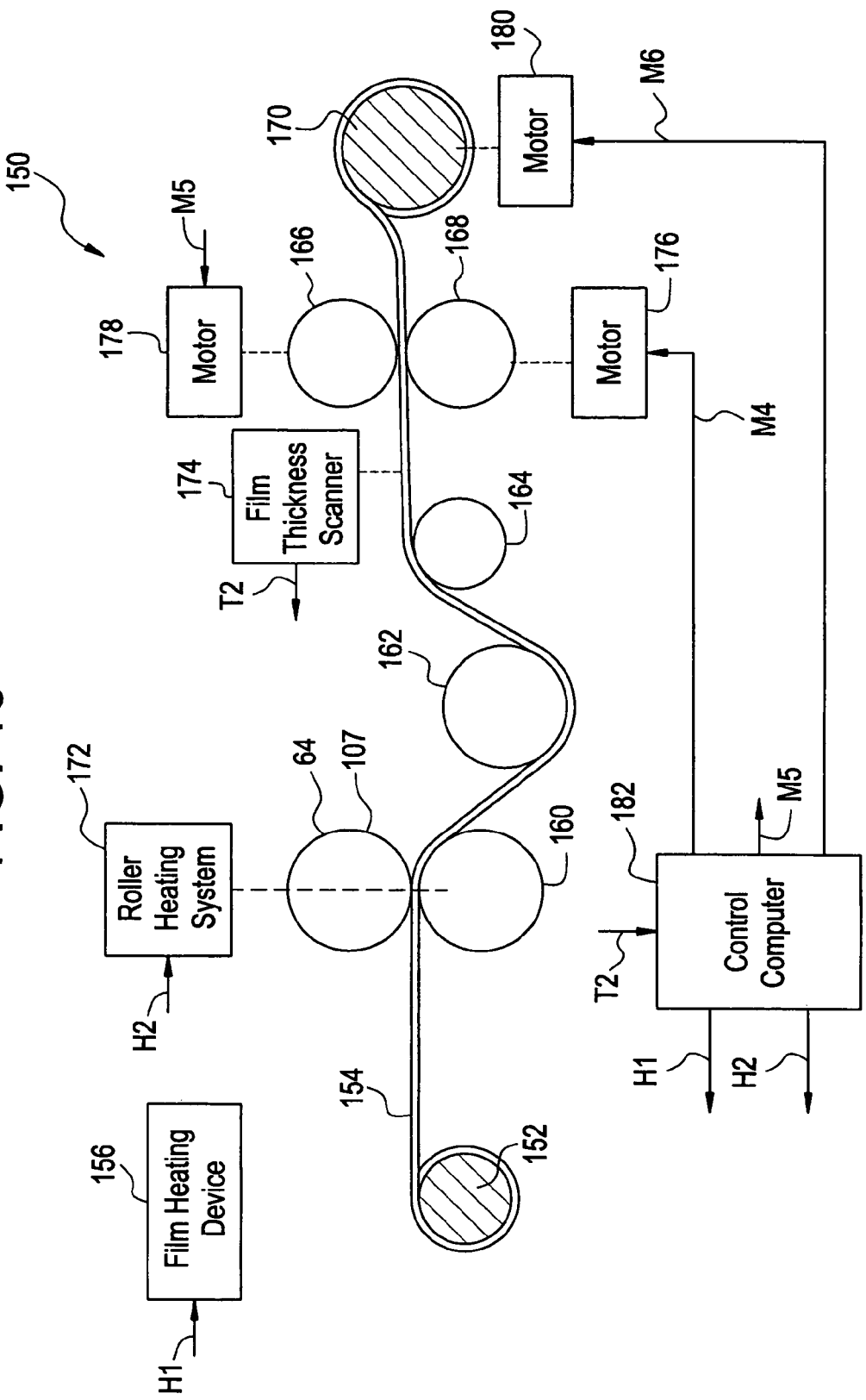
FIG. 10 is a schematic of an embossing system for manufacturing a light collimating and diffusing film in accordance with another exemplary embodiment.

Referring to FIG. 10, an embossing system 150 for manufacturing a plastic layer 154 that can be subsequently cut into a predetermined shape to form the film 28 is illustrated. The embossing system 150 includes a cylindrical spool 152, a film-heating device 156, cylindrical rollers 64, 160, 162, 164, 166, 168, a cylindrical spool 170, a roller heating system 172, a film thickness scanner 174, motors 176, 178, 180, and a control computer 182.

The cylindrical spool 152 is provided to hold the plastic layer 150 thereon. When the cylindrical spool 152 rotates, a portion of the plastic layer 150 is unwound from the spool 152 and moves toward the cylindrical rollers 64, 160.

The film-heating device 156 is provided to heat the plastic layer 150 as it moves from the cylindrical spool 152 towards the cylindrical rollers 64, 160. The control computer 182 generates a signal (H1) that is transmitted to the film-heating device 156 that induces the device 156 to heat the plastic layer 150 above a predetermined temperature.

The cylindrical rollers 64, 160 are provided to receive the plastic layer 154 therebetween from the cylindrical spool 152 and to form a textured surface on a least one side of the plastic layer 154. The cylindrical rollers 64, 160 are preferably constructed from steel and are operably coupled to the roller heating system 172. Of course, in an alternate embodiment, the cylindrical rollers 64, 160 may be constructed from other metallic or non-metallic materials known to those skilled in the art. The roller heating system 172 maintains a temperature of the rollers 64, 160 above a predetermined temperature to at least partially melt the plastic layer 154 as it passes between the rollers 64, 160. The cylindrical roller 64 has an outer textured surface 107 wherein between 7 to 20 percent of slope angles on the textured surface 107 have a value between zero and five degrees. Thus, when the cylindrical roller 64 contacts a first side of the plastic layer 154, the cylindrical roller 64 forms a textured surface on the plastic layer 154, wherein between 7 to 20 percent of slope angles on the top surface of the layer 154 have a value between zero and five degrees.

The cylindrical rollers 162, 164 are configured to receive the plastic layer 154 after the layer 154 has passed between the rollers 64, 160. The position of the cylindrical roller 162 can be adjusted to vary an amount of surface area of the plastic layer 154 that contacts the cylindrical roller 160. The cylindrical roller 164 receives a portion of the plastic layer 154 downstream of the roller 162 and directs the plastic layer 154 toward the cylindrical rollers 166, 168.

The cylindrical rollers 166, 168 are provided to receive the plastic layer 154 and to move the plastic layer 154 toward the cylindrical spool 170. The cylindrical rollers 166, 168 are operably coupled to the motors 178, 176, respectively. The control computer 182 generates control signals (M4), (M5) which induce motors 176, 178, respectively, to rotate the rollers 168, 166 in predetermined directions for urging the plastic layer 154 towards the spool 170.

The cylindrical spool 170 is provided to receive the plastic layer 154 and to form a roll of plastic layer 154. The cylindrical spool 170 is operably coupled to the motor 180. The control computer 182 generates a control signal (M6) that induces the motor 180 to rotate the spool 170 in predetermined direction for forming a roll of the plastic layer 154.

The film thickness scanner 174 is provided to measure a thickness of the plastic layer 154 prior to the layer 154 being received by the cylindrical rollers 114, 116. The film thickness scanner 174 generates a signal (T2) indicative of the thickness of the plastic layer 154 that is transmitted to the control computer 182.

Figure 11:
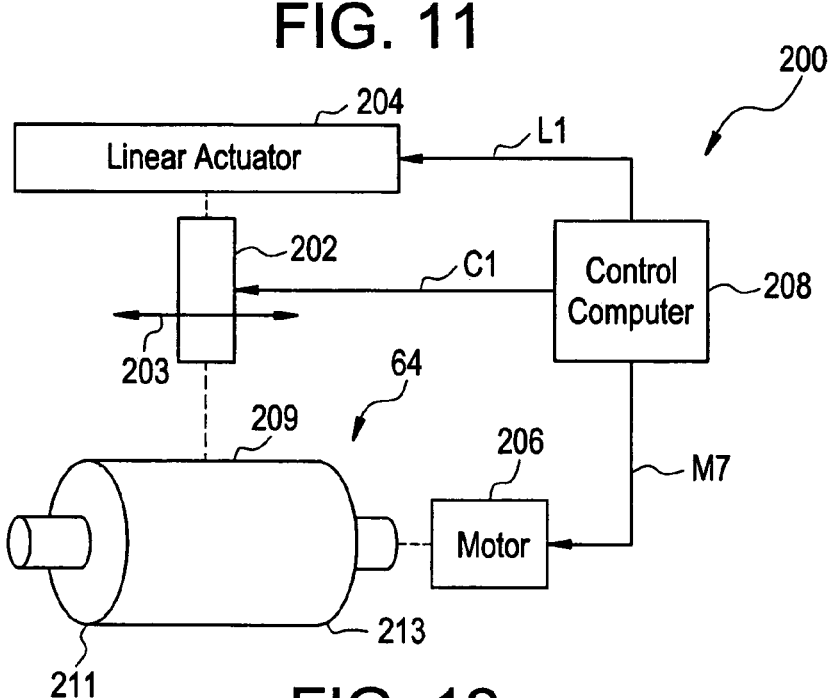
FIG. 11 is a schematic of an energy beam engraving system for obtaining a textured surface on a cylindrical roller in accordance with another exemplary embodiment.

Referring to FIG. 11, a system 200 for forming a textured surface on the cylindrical roller 64 in accordance with an exemplary embodiment is illustrated. The cylindrical roller 64 has a textured surface can be utilized in the melt calendaring system 100 or the embossing system 150 to form a textured plastic layer used to obtain the film 28. The system 200 includes a laser 202, a linear actuator 204, a motor 206, and a control computer 208.

The laser 202 is provided to emit a pulsating laser beam that contacts an outer surface at a predetermined intensity to remove portions of the outer surface 209 to obtain a textured surface thereon. The laser beam emitted by the laser 202 has a focal diameter at the outer surface 209 of the cylindrical roller 64 in a range of 0.005-0.5 millimeters. Further, the laser beam has an energy level in a range of 0.05-1.0 Joules delivered over a time period in a range of 0.1-100 microseconds for a predetermined area of the cylindrical roller 64. The laser 202 is operably coupled to the control computer 208 and generates the laser beam in response to a control signal (C1) being received from the control computer 208. The laser 102 comprises a neodymium (Nd):yttrium, aluminum, garnet (YAG) laser configured to emit a laser beam having a wavelength of 1.06 microns. It should be understood, however, that any laser source capable of forming the desired textured surface on a cylindrical roller can be utilized. In an alternate embodiment, the laser 202 can be replaced with an electron beam emission device configured to form the desired textured surface on a cylindrical roller. In still another alternate embodiment, the laser 202 can be replaced with an ion beam emission device configured to form the desired textured surface on a cylindrical roller.

The linear actuator 204 is operably coupled to the laser 202 for moving the laser 202 along an axis 203. The axis 203 is substantially parallel to the outer surface 209 of the cylindrical roller 64. The linear actuator 204 moves the laser 202 relative to the cylindrical roller 64 at a speed within a range of 0.001-0.1 millimeters per second0. In an alternate embodiment, linear actuator 204 could be coupled to cylindrical roller 64 to move the roller 64 in an axial direction relative to a stationary laser.

The motor 206 is operably coupled to the cylindrical roller 64 to rotate the roller 64 while the linear actuator 204 is moving the laser 202 along the axis 203 from an end 211 to an end 213 of the roller 64. The control computer 200 generates a signal (M7) that induces the motor 206 to rotate the cylindrical roller 64 at a predetermined speed. In particular, the motor 206 rotates the cylindrical roller 64 such that a linear speed of the outer surface 209 is within a range of 25-2500 millimeters per second.

Figure 12:
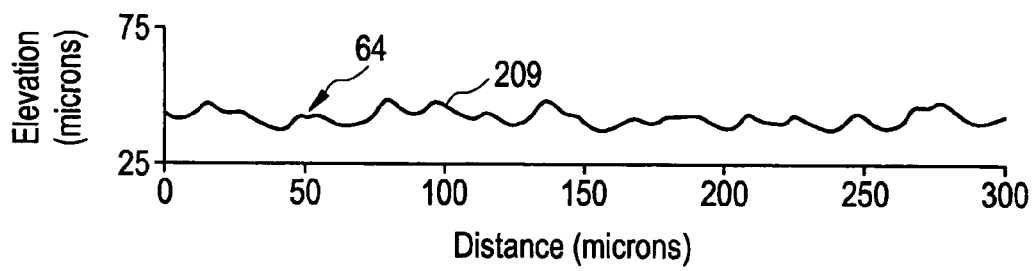
FIG. 12 is a schematic of a textured surface on a cylindrical roller obtained using the energy beam engraving system of FIG. 11.

Referring to FIG. 12, a cross-sectional view of a portion of a textured surface 209 of the cylindrical roller 64 is illustrated. The textured surface 209 was obtained utilizing the energy beam engraving system 200. The textured surface 209 has a slope angle distribution wherein between 7 to 20 percent of slope angles on the textured surface 209 have a value between zero and five degrees.

Figure 13:
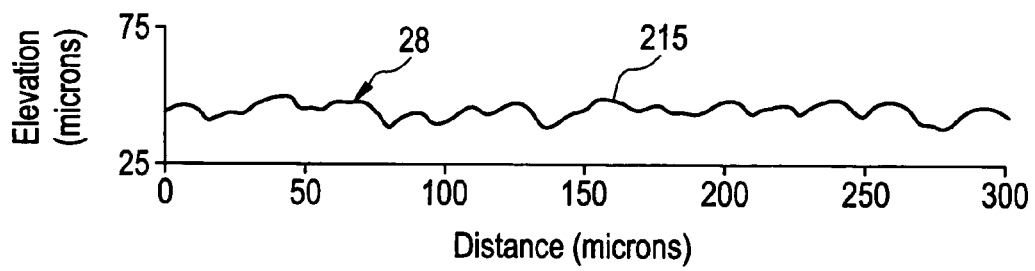
FIG. 13 is a schematic of a textured surface on a light collimating and diffusing film obtained using the cylindrical roller of FIG. 12.

Referring to FIG. 13, a cross-sectional view of a portion of a textured surface 215 of the light collimating and diffusing film 28 cut from a textured plastic layer formed by the cylindrical roller 64 is illustrated. The film 28 has a slope angle distribution wherein between 7 to 20 percent of slope angles on the film 28 have a value between zero and five degrees.

Figure 14:
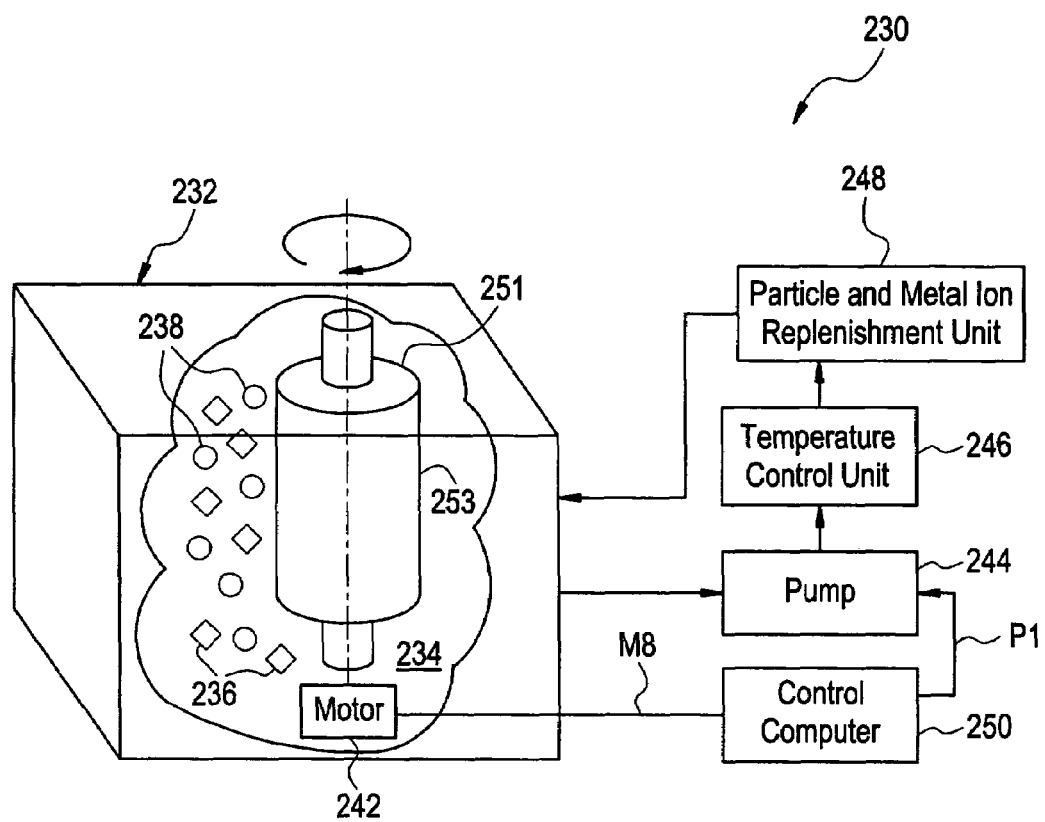
FIG. 14 is a schematic of a particle and metal ion co-deposition system for obtaining a textured surface on a cylindrical roller in accordance with another exemplary embodiment.

Referring to FIG. 14, a system 230 for forming a textured surface on the cylindrical roller 251 in accordance with another exemplary embodiment is illustrated. The cylindrical roller 251 can be utilized either in the melt calendaring system 100 or the embossing system 150 to form a textured plastic layer that can be subsequently cut into a predetermined shape to obtain a film having the physical characteristics of film 28 described above. The system 230 includes a housing 232, a motor 242, a pump 244, a temperature control unit 246, a particle and metal ion replenishment unit 248, and a control computer 250.

The housing 232 defines an interior region 234 for receiving a cylindrical roller 251. The housing 232 holds a fluid containing a plurality of metal ions 236 and a plurality of non-metal particles 238. The non-metal particles have a size or diameter in a range of 1-100 micrometers. The non-metal particles comprise silica particles. The silica particles can be solid silica particles, hollow silica particles, or porous silica particles. In an alternate embodiment, the non-metal particles comprise alumina particles. The alumina particles can be solid alumina particles, hollow alumina particles, or porous alumina particles. In yet another alternate embodiment, the non-metal particles comprise diamond particles. The metal ions comprise nickel ions and nickel alloy ions. When the fluid is maintained at a desired temperature within the housing 232, the non-metal particles and the metal ions in the fluid chemically bond to an external surface 253 of the cylindrical roller 251 to form a textured surface. The cylindrical roller 251 is rotated within the fluid to obtain a textured surface wherein between 7 to 20 percent of slope angles on the textured surface have a value between zero and five degrees.

The motor 242 is operably coupled to the cylindrical roller 251 and is provided to rotate the cylindrical roller 251 at a predetermined rotational speed. The motor 242 is disposed within the housing 232. In an alternate embodiment, the motor 242 is disposed outside of the housing 232 with a shaft (not shown) extending through the housing 232 coupled to the cylindrical roller 251 for rotating the roller 251. The control computer 250 generates a signal (M8) that induces the motor 242 to rotate the cylindrical roller 251 at a predetermined rotational speed.

The pump 244 is provided to pump the fluid containing the non-metal particles and the metal ions from the housing 232 through the temperature control unit 246 and the particle and metal-ion replenishment unit 248. In particular, the control computer 250 generates a signal (PI) that induces the pump 244 to pump the fluid from housing 232 through the unit 246 and the unit 248 and back to the interior region 234.

The temperature control unit 246 is operably coupled to the pump 244 and receives the fluid containing non-metal particles and the metal-ions from the pump 244. The temperature control unit 246 is provided to control a temperature of the fluid being pumped therethrough at a desired temperature that allows the co-deposition of the non-metal particles and metal-ions onto the outer surface 253 of the cylindrical roller 251. The temperature control unit 246 monitors a temperature of the fluid in pump therethrough and either increases or decreases the temperature of the fluid to the desired temperature.

The particle and metal ion replenishment unit 248 is operably coupled to the temperature control unit 246 and receives the fluid containing the non-metal particles in the metal-ions from the unit 246. The unit 248 monitors the concentration of the non-metal particles and the metal ions during the co-deposition of the particles and metal ions on the surface 253. It will be understood, that as the non-metal particles and the metal ions are bonded to the outer surface 253 of the roller 251, the concentration of the non-metal particles and metal ions in the fluid will be decreased. The unit 248 measures the concentration of the non-metal particles and the metal ions in the fluid being pumped therethrough and adds an additional amount of non-metal particles and metal ions to the fluid to maintain a desired concentration of each material. After the fluid is conditioned by the unit 248, the fluid is routed to the interior region 234 of the housing 232.

Figure 15:
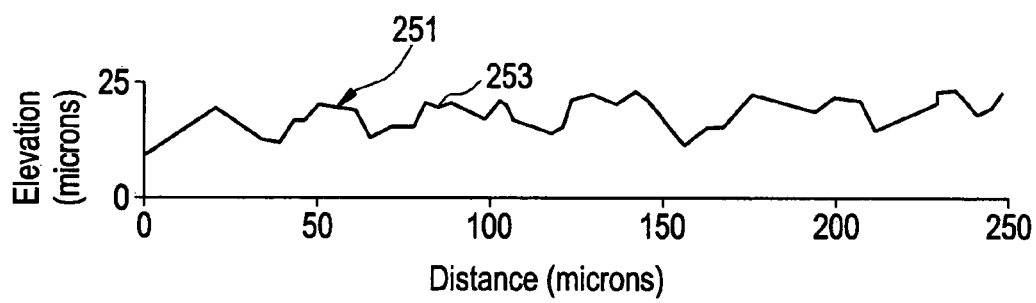
FIG. 15 is a schematic of a textured surface on a cylindrical roller obtained using the particle and metal ion co-deposition system of FIG. 14.

Referring to FIG. 15, a cross-sectional view of a portion of a textured surface 253 of the cylindrical roller 251 is illustrated. The textured surface 253 was obtained utilizing the particle and metal ion co-deposition system 230. The textured surface 253 has a slope angle distribution wherein between 7 to 20 percent of slope angles on the textured surface 253 have a value between zero and five degrees.

Figure 16:
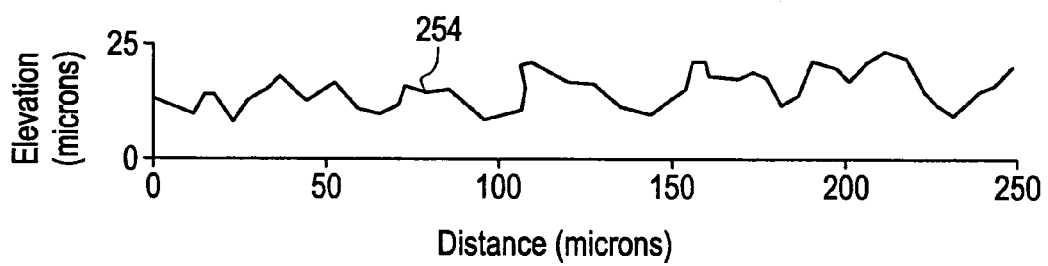
FIG. 16 is a schematic of a textured surface on a light collimating and diffusing film obtained using the cylindrical roller of FIG. 15.

Referring to FIG. 16, a cross-sectional view of a portion of a textured surface 254 of the light collimating and diffusing film cut from a textured plastic layer formed by the cylindrical roller 251 is illustrated. The textured surface 254 has a slope angle distribution wherein between 7 to 20 percent of slope angles on the textured surface 28 have a value between zero and five degrees.

Figure 17:
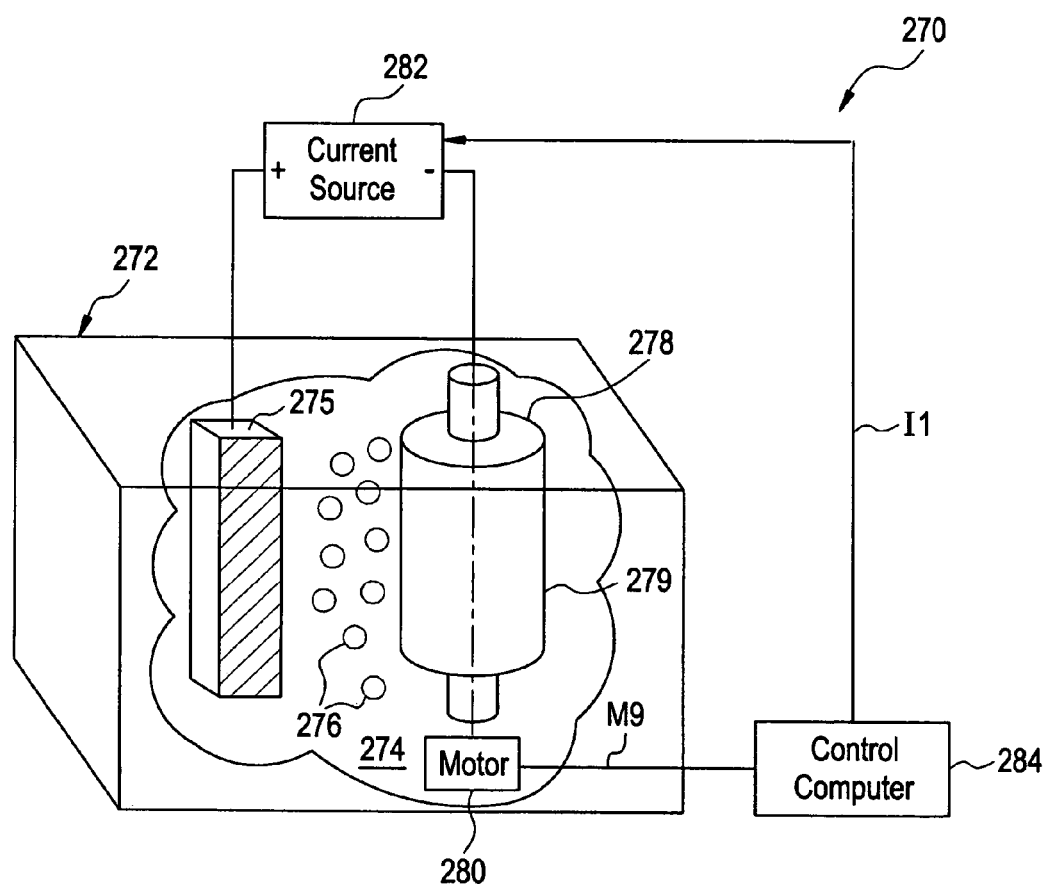
FIG. 17 is a schematic of a metal ion deposition system for obtaining a textured surface on a cylindrical roller in accordance with another exemplary embodiment.

Referring to FIG. 17, a system 270 for forming a textured surface on the cylindrical roller 278 in accordance with another exemplary embodiment is illustrated. The cylindrical roller 278 can be utilized either in the melt calendaring system 100 or the embossing system 150 to form a textured plastic layer used to obtain a film having physical characteristics substantially similar to film 28 described above. The system 270 includes a housing 272, a motor 280, a current source 282, and a control computer 284.

The housing 272 defines an interior region 274 for receiving a cylindrical roller 278. The housing 272 holds an electrolye fluid containing a plurality of metal ions 276. In one embodiment, the plurality of metal ions 276 comprise chromium ions. When a predetermined current density is applied in the electrolyte fluid, the metal ions 276 bond to the outer surface 279 of the cylindrical roller 278 to form a textured surface. The cylindrical roller 278 is rotated within the electrolyte fluid to obtain a textured surface wherein between 7 to 20 percent of slope angles on the textured surface have a value between zero and five degrees.

The motor 280 is operably coupled to the cylindrical roller 278 and is provided to rotate the cylindrical roller 278 at a predetermined rotational speed for a predetermined time period. For example, the motor 280 can rotate the cylindrical roller 278 at a rotational speed in a range of 1-10 revolutions per minute for a time period in a range of 0.5-50 hours. The motor 280 is disposed within the housing 272. In an alternate embodiment, the motor 280 is disposed outside of the housing 272 with a shaft (not shown) extending through the housing 272 coupled to the cylindrical roller 278 for rotating the roller 278. In particular, the control computer 284 generates a signal (M9) that induces the motor 280 to rotate the cylindrical roller 278 at the desired rotational speed.

The current source 282 is provided to apply a predetermined electrical current density through the electrolyte fluid to induce metal ions in the electrolyte fluid to adhere to the outer surface 279 of the cylindrical roller 278. The current source 280 is electrically coupled between a metal bar 275 immersed in the electrolyte fluid and the cylindrical roller 278. The current source 280 is further operably coupled to the control computer 284. The control computer 284 generates a control signal (I1) that induces the current source 282 to generate an electrical current through the electrolyte fluid. In one embodiment, the current source 280 generates a current density in a range of 0.001-0.1 amperes per square millimeter in the electrolyte fluid to induce the metal ions in the fluid to adhere to the cylindrical roller 278.

Figure 18:
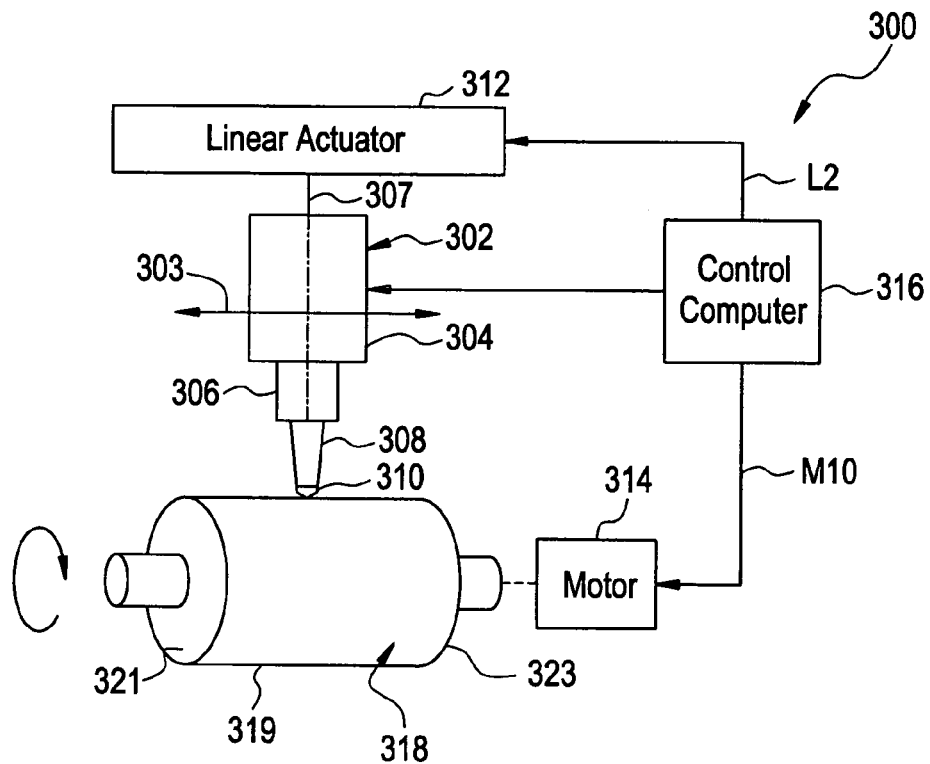
FIG. 18 is a schematic of a micro-machining engraving system for obtaining a textured surface on a cylindrical roller in accordance with another exemplary embodiment.

Referring to FIG. 18, a system 300 for forming a textured surface on the cylindrical roller 318 in accordance with another exemplary embodiment is illustrated. The cylindrical roller 318 can be utilized either in the melt calendaring system 100 or the embossing system 150 to form a textured plastic layer that can be subsequently cut into a predetermined shape to obtain a film having physical characteristics substantially similar to film 28 described above. The system 300 includes engraving device 302, a linear actuator 312, a motor 314, and a control computer 316.

The engraving device 302 is provided to iteratively contact the outer surface 319 of the cylindrical roller 318 at a predetermined frequency to remove portions of the outer surface 319 to obtain a textured surface. In particular, the predetermined frequency is preferably within a range of 1000-1500 Khz. The engraving device 302 includes a piezo-electric transducer unit 304, a reciprocating member 306, a cutting tool holder 308, and a cutting tool 310.

The piezo-electric transducer unit 304 is provided to iteratively move the reciprocating member 306 upwardly and downwardly along the axis 307 at the predetermined frequency in response to a control signal (P) received from the control computer 316. The reciprocating member 306 is further operably coupled to a first end of the cutting tool holder 308 that holds a cutting tool 310.

Figure 19:
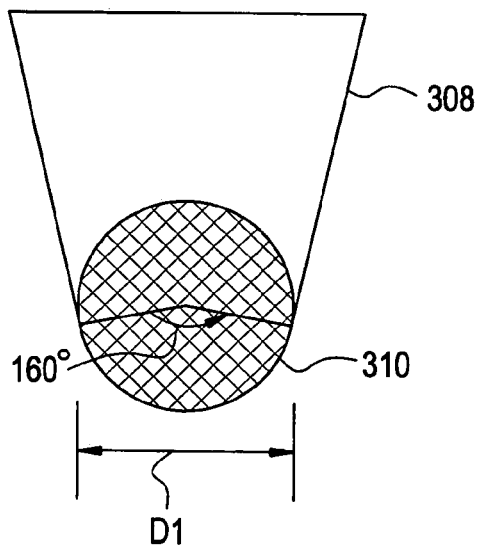
FIG. 19 is an enlarged front view of a cutting cool utilized in the system of FIG. 18.
Figure 20:
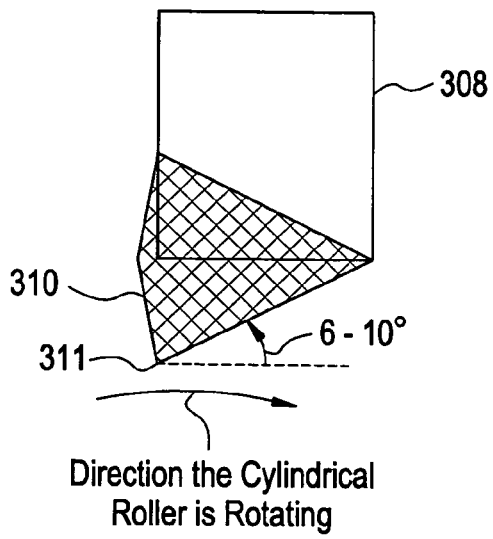
FIG. 20 is an enlarged side view of the cutting cool utilized in the system of FIG. 18.

Referring to FIGS. 19 and 20, the cutting tool 310 is provided to remove portions of the outer surface 319 of the cylindrical roller 318. The cutting tool 310 is constructed from a diamond having a tip diameter (D1) in a range of 2-30 micrometers. The cutting tool 310 has a cutting surface 311 that extends 160 degrees about a center point of the tool 310. The cutting surface 311 of the tool 310 iteratively contacts the outer surface 319 as the outer surface 319 is being rotated at a predetermined speed.

The linear actuator 312 is operably coupled to the engraving device 302 for moving the engraving device 302 along an axis 303. The axis 303 is substantially parallel to the outer surface 319 of the cylindrical roller 318. The linear actuator 312 moves the engraving device 302 relative to the cylindrical roller 318 at a predetermined determined axial speed from a first end 321 to a second end 323 of the cylindrical roller 318. In an alternate embodiment, linear actuator 312 could be coupled to the cylindrical roller 318 to move the roller 318 in an axial direction relative to a stationary engraving device.

The motor 314 is operably coupled to the cylindrical roller 318 to rotate the roller 318 while the linear actuator 312 is moving the engraving device 302 along the axis 303 from the end 321 to the end 323. The control computer 316 generates a signal (M10) that induces the motor 314 to rotate the cylindrical roller 318 at a predetermined rotational speed. In particular, the motor 310 rotates the cylindrical roller 318 at a rotational speed within a range of 10-200 revolutions per minute.

Figure 21:
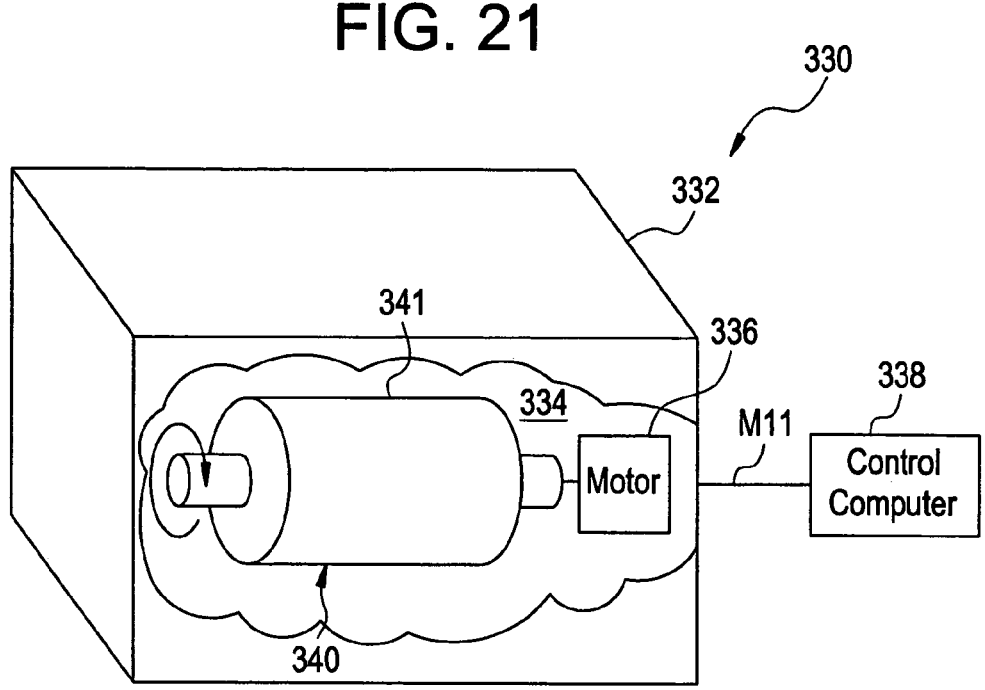
FIG. 21 is a schematic of chemical etching engraving system for obtaining a textured surface on a cylindrical roller in accordance with another exemplary embodiment.

Referring to FIG. 21, a system 330 for forming a textured surface on the cylindrical roller 340 in accordance with another exemplary embodiment is illustrated. The cylindrical roller 340 can be utilized either in the melt calendaring system 100 or the embossing system 150 to form a textured plastic layer that can be subsequently cut into a predetermined shape to obtain a film having physical characteristics substantially similar to film 28 described above. The system 330 includes a housing 332, a motor 336, and a control computer 338.

Figure 22:
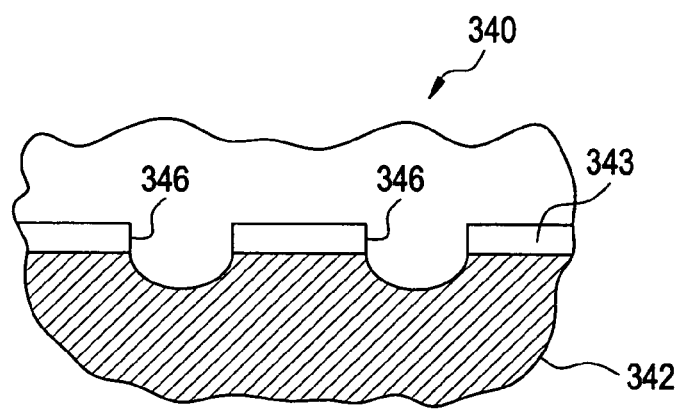
FIG. 22 is an enlarged cross-sectional view of a portion of the cylindrical roller utilized by the system of FIG. 21.

Before explaining the operation of the system 330, a brief explanation of the structure of the cylindrical roller 340 will be provided. Referring to FIG. 22, the cylindrical roller 340 has a substantially cylindrical inner portion 342 coated with a chemically resistant layer 343. The chemically resistant layer 343 comprises a plastic layer. In an alternate embodiment, the chemically resistant layer 343 comprises a wax layer. In yet another alternate embodiment, the chemically resistant layer 343 comprises a photo-resist layer. After the cylindrical roller 340 has been coated by the chemically resistant layer 343, portions of the layer 343 at predetermined locations (e.g., locations 346) are removed. Portions of the layer 343 are removed at predetermined locations using an energy beam, such as a laser. In an alternate embodiment, portions of the layer 343 are removed at the predetermined locations using a tool (not shown) having a hardness greater than the chemically resistant layer 343 but less than a hardness of the cylindrical inner portion 342. In yet another alternate embodiment, the chemically resistant layer 343 is removed at the predetermined locations using a lithographic process known to those skilled in the art.

The housing 332 defines an interior region 334 for receiving a cylindrical roller 340. The housing 332 holds an etching solution for removing exposed portions of the inner portion 342 of the cylindrical roller 340. The etching solution includes nitric acid wherein 5 to 25 percent of a mass of the etching solution is nitric acid. In an alternate embodiment, the etching solution includes hydrochloric acid wherein 5 to 25 percent of a mass of the etching solution is hydrochloric acid. When the cylindrical roller 340 is rotated within the etching fluid, the etching fluid removes portions of the cylindrical roller 340 proximate the locations 346 to form a textured surface wherein between 7 to 20 percent of slope angles on the textured surface have a value between zero and five degrees.

The motor 336 is operably coupled to the cylindrical roller 340 and is provided to rotate the cylindrical roller 340 at a predetermined rotational speed. The motor 336 is disposed within the housing 332. In an alternate embodiment, the motor 336 is disposed outside of the housing 332 with a shaft (not shown) extending through the housing 332 coupled to the cylindrical roller 340 for rotating the roller 340. The control computer 338 generates a signal (M11) that induces the motor 336 to rotate the cylindrical roller 341 at a predetermined rotational speed. In particular, the motor 336 can rotate the cylindrical roller 341 at a rotational speed in a range of 1-50 revolutions per minute.

Referring to FIG. 23, a system 370 for forming a textured surface on the cylindrical roller 390 in accordance with another exemplary embodiment is illustrated. The cylindrical roller 390 can be utilized either in the melt calendaring system 100 or the embossing system 150 to form a textured plastic layer that can be subsequently cut into a predetermined shape to obtain a film having physical characteristics substantially similar to film 28 described above. The system 370 includes an electrode or an electrode array 372, a voltage source 374, a linear actuator 376, a motor 378, a pump 382, a filter 384, a dielectric fluid source 386, and a control computer 388.

The electrode 372 is provided to iteratively discharge an electric spark that contacts an outer surface 391 to remove portions of the surface 391 to obtain a textured surface. The electrode 372 is operably coupled to the voltage source 374 and receives a voltage from the voltage source 374 to generate an electric spark having a voltage in a range of 100-1000 volts. The voltage source 374 is operably coupled to the control computer 388. The control computer 380 generates a signal (V2) that induces the voltage source 374 to apply a predetermined voltage to the electrode 372. The electrode 372 is further operably coupled to the linear actuator 376. When the cylindrical roller 390 is being rotated, the electrode 372 is moved along axis 373 and iteratively discharges an electric spark to remove portions of the cylindrical roller 390 to form a textured surface wherein between 7 to 20 percent of slope angles on the textured surface have a value between zero and five degrees.

The pump 382 is provided to pump a dielectric fluid from the dielectric fluid reservoir 386 through a filter 384 and finally through the nozzle 380. The nozzle 380 directs the dielectric fluid onto the outer surface 391 of the cylindrical roller 390. The dielectric fluid is utilized to conduct an electric spark therethrough to the outer surface 391 of the cylindrical roller 390. The nozzle 380 is further operably coupled to the linear actuator 376.

The linear actuator 376 is operably coupled to both the electrode 372 and the nozzle 380. The linear actuator 376 moves the electrode 372 and the nozzle 380 along an axis 373 that is substantially parallel to the outer surface of the cylindrical roller 390. In particular, the linear actuator 376 moves the electrode 372 and the nozzle 380 along the axis 373 from a first end 393 to a second end 395 of the cylindrical roller 390.

The motor 378 is operably coupled to the cylindrical roller 390 to rotate the roller 390 while the linear actuator 376 is moving both the electrode 372 and the nozzle 380 along the axis 373 from the end 393 to the end 395. The control computer 388 generates a signal (M12) that induces the motor 378 to rotate the cylindrical roller 390 at a predetermined rotational speed.

The light collimating and diffusing film and the method for manufacturing the film represents a substantial advantage over other systems and methods. In particular, the system and method have a technical effect of providing a plastic layer having a textured surface capable of diffusing light that can readily manufactured without having any additional material being added to the plastic layer such as polystryene beads or an acrylate solution.

While the invention is described with reference to exemplary embodiments, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited to the embodiments disclosed for carrying out this invention, but that the invention includes all embodiments falling with the scope of the intended claims. Moreover, the use of the term's first, second, etc. does not denote any order of importance, but rather the term's first, second, etc. are used to distinguish one element from another.

What is claimed is:

1. A method for manufacturing a light collimating and diffusing film, comprising:
    extruding heated plastic through a die to form a plastic layer, the plastic layer having a first side and a second side opposite the first side and at least a first peripheral edge, the plastic layer extending along both a first axis and a second axis, the first axis being substantially parallel to the first peripheral edge, the second axis being substantially perpendicular to the first axis;
    cooling at least one of first and second rotating cylindrical rollers below a predetermined temperature; and
    moving the plastic layer between first and second rotating cylindrical rollers, the first cylindrical roller contacting the first side of the plastic layer and the second cylindrical roller contacting the second side, the first cylindrical roller forming a first textured surface on the first side of the plastic layer, wherein between 7 to 20 percent of slope angles on the first textured surface proximate the first axis have a value between zero and five degrees.

2. The method of claim 1, wherein between 7 to 20 percent of slope angles on the first textured surface proximate the second axis have a value between zero and five degrees.

3. The method of claim 1, further comprising winding the cooled plastic layer around a receiving spool.

4. The method of claim 1, wherein between 7 to 20 percent of slope angles on the first textured surface have a value between zero and five degrees.

5. A system for manufacturing a light collimating and diffusing film, comprising:
   an extruder device operably coupled to a die, the extruder device urging heated plastic through the die to form a plastic layer, the plastic layer having a first side and a second side opposite the first side and at least a first peripheral edge, the plastic layer extending along both a first axis and a second axis, the first axis being substantially parallel to the first peripheral edge, the second axis being substantially perpendicular to the first axis;
   first and second cylindrical rollers disposed proximate one another for receiving the plastic layer; and
   a cooling device configured to cool at least one of the first and second cylindrical rollers below a predetermined temperature, wherein the first cylindrical roller contacts the first side of the plastic layer and forms a first textured surface on the first side of the plastic layer, the second cylindrical roller contacts the second side of the plastic layer, wherein between 7 to 20 percent of slope angles on the first textured surface proximate the first axis have a value between zero and five degrees.

6. The system of claim 5, wherein between 7 to 20 percent of slope angles on the first textured surface proximate the second axis have a value between zero and five degrees.

7. The system of claim 5, wherein the second cylindrical roller forms a second textured surface on the plastic layer, wherein greater than or equal to 70 percent of slope angles on the second textured surface have a value between zero and five degrees.

8. The system of claim 5, further comprising:
   third and fourth cylindrical rollers disposed proximate one another for receiving the cooled plastic layer from the first and second rollers, the third and fourth cylindrical rollers both being configured to rotate to urge the plastic layer toward a winder device, the winder device receiving the plastic layer and winding the plastic layer around a receiving spool.

9. The system of claim 5, wherein between 7 to 20 percent of slope angles on the first textured surface have a value between zero and five degrees.

10. A method for manufacturing a light collimating and diffusing film, comprising:
    heating a plastic layer having a first side and a second side, the plastic layer having a first side and a second side opposite the first side and at least a first peripheral edge, the plastic layer extending along both a first axis and a second axis, the first axis being substantially parallel to the first peripheral edge, the second axis being substantially perpendicular to the first axis;
    heating at least one of the first and second cylindrical rollers above a predetermined temperature; and
    moving the plastic layer between first and second rotating cylindrical rollers wherein the first cylindrical roller contacts the first side of the plastic layer and the second cylindrical roller contacts the second side, the first cylindrical roller forming a first textured surface on the first side proximate the first axis of the plastic layer, wherein between 7 to 20 percent of slope angles on the first textured surface proximate the first axis have a value between zero and five degrees.

11. The method of claim 10, wherein between 7 to 20 percent of slope angles on the first textured surface proximate the second axis have a value between zero and five degrees.

12. The method of claim 10, further comprising winding the plastic layer around a receiving spool.

13. The method of claim 10, wherein between 7 to 20 percent of slope angles on the first textured surface have a value between zero and five degrees.

14. A system for manufacturing a light collimating and diffusing film, comprising:
    a first heating device configured to heat a plastic layer, the plastic layer having a first side and a second side opposite the first side and at least a first peripheral edge, the plastic layer extending along both a first axis and a second axis, the first axis being substantially parallel to the first peripheral edge, the second axis being substantially perpendicular to the first axis;
    first and second cylindrical rollers being disposed proximate one another for receiving the plastic layer; and
    a second heating device configured to heat at least one of first and second cylindrical rollers, wherein the first cylindrical roller contacts the first side of the plastic layer and forms a first textured surface on the first side and the second cylindrical roller contacts the second side of the plastic layer, wherein between 7 to 20 percent of slope angles on the first textured surface proximate the first axis have a value between zero and five degrees.

15. The system of claim 14, wherein between 7 to 20 percent of slope angles on the first textured surface proximate the second axis have a value between zero and five degrees.

16. The system of claim 14, wherein the second cylindrical roller forms a second textured surface on the second side, wherein greater than or equal to 70 percent of slope angles on the second textured surface have a value between zero and five degrees.

17. The system of claim 14, further comprising:
    third and fourth cylindrical rollers disposed proximate one another for receiving the cooled plastic layer from the first and second cylindrical rollers, the third and fourth cylindrical rollers both being configured to rotate to urge the plastic layer toward a winder device, the winder device receiving the plastic layer and winding the plastic layer around a receiving spool.

18. The system of claim 14, wherein between 7 to 20 percent of slope angles on the first textured surface have a value between zero and five degrees.

* * * * *